(12) United States Patent
Lee et al.

(10) Patent No.: US 10,230,935 B2
(45) Date of Patent: Mar. 12, 2019

(54) METHOD AND A SYSTEM FOR GENERATING DEPTH INFORMATION ASSOCIATED WITH AN IMAGE

(71) Applicant: Marvel Digital Limited, Shatin, New Territories (HK)

(72) Inventors: Ying Chiu Herbert Lee, Shatin (HK); Wai Keung Cheung, Shatin (HK)

(73) Assignee: Marvel Digital Limited, Shatin, New Territories (HK)

( * ) Notice: Subject to any disclaimer, the term of this patent is extended or adjusted under 35 U.S.C. 154(b) by 136 days.

(21) Appl. No.: 15/404,461

(22) Filed: Jan. 12, 2017

(65) Prior Publication Data

US 2018/0103243 A1   Apr. 12, 2018

(30) Foreign Application Priority Data

Oct. 11, 2016   (HK) .................................. 16111725

(51) Int. Cl.

| | |
|---|---|
| *H04N 13/128* | (2018.01) |
| *G06K 9/46* | (2006.01) |
| *G06K 9/52* | (2006.01) |
| *H04N 13/15* | (2018.01) |
| *H04N 13/122* | (2018.01) |
| *G06T 5/00* | (2006.01) |
| *G06T 5/20* | (2006.01) |

(Continued)

(52) U.S. Cl.
CPC ......... *H04N 13/128* (2018.05); *G06K 9/4604* (2013.01); *G06K 9/52* (2013.01); *G06T 5/003* (2013.01); *G06T 5/20* (2013.01); *G06T 5/50* (2013.01); *G06T 7/12* (2017.01); *G06T 7/187* (2017.01); *H04N 13/122* (2018.05); *H04N 13/15* (2018.05); *G06T 2207/10024* (2013.01); *G06T 2207/10028* (2013.01); *G06T 2207/20028* (2013.01); *H04N 2013/0081* (2013.01)

(58) Field of Classification Search
None
See application file for complete search history.

(56) References Cited

U.S. PATENT DOCUMENTS

2004/0165785 A1\* 8/2004 Monobe ............... H04N 19/176
382/268
2013/0071008 A1   3/2013 Chen et al.
(Continued)

FOREIGN PATENT DOCUMENTS

| CN | 102113017 A | 6/2011 |
| CN | 103916654 A | 7/2014 |

OTHER PUBLICATIONS

Oct. 13, 2016 Search Report for Hong Kong Short-Term Patent Application concerning Hong Kong Patent No. HK1231318 A.

*Primary Examiner* — Eileen M Adams
(74) *Attorney, Agent, or Firm* — Duane Morris, LLP

(57) ABSTRACT

A method and a system for generating depth information associated with an image. The system comprises a segmentation module arranged to identify a plurality of objects represented by the image, wherein each object adjacent to another object are identified by an edge arranged to substantially separate the object and the adjacent object; and a processing module arranged to generate the depth information by assigning a depth value for each of the plurality of objects, wherein the depth value is arranged to represent a distance between the object and a reference point in a three-dimensional space.

26 Claims, 14 Drawing Sheets

(51) Int. Cl.
    *G06T 5/50*     (2006.01)
    *G06T 7/12*     (2017.01)
    *G06T 7/187*     (2017.01)
    *H04N 13/00*     (2018.01)

(56) References Cited

U.S. PATENT DOCUMENTS

| | | | |
|---|---|---|---|
| 2014/0347529 A1* | 11/2014 | Huang | H04N 5/23212 348/254 |
| 2015/0156472 A1* | 6/2015 | Jang | H04N 13/128 348/51 |
| 2018/0061056 A1* | 3/2018 | Zhao | G06T 7/0051 |
| 2018/0103243 A1 | 4/2018 | Lee et al. | |

\* cited by examiner

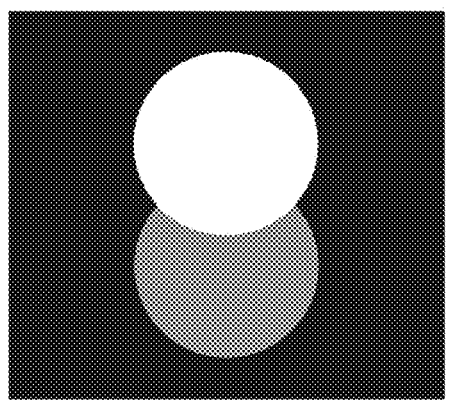
FIG. 1
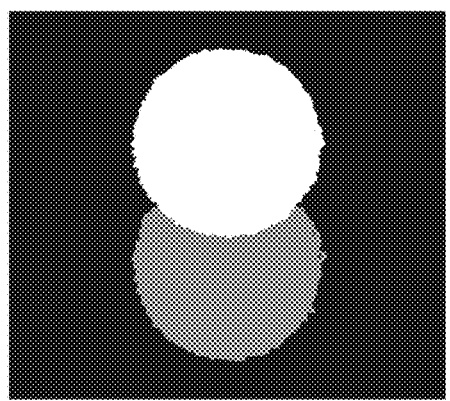
FIG. 2
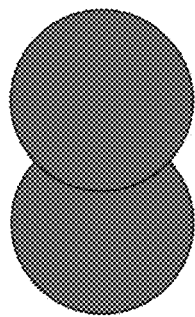
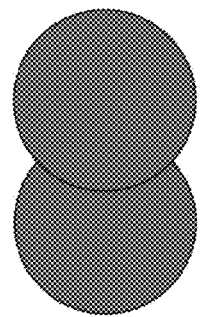

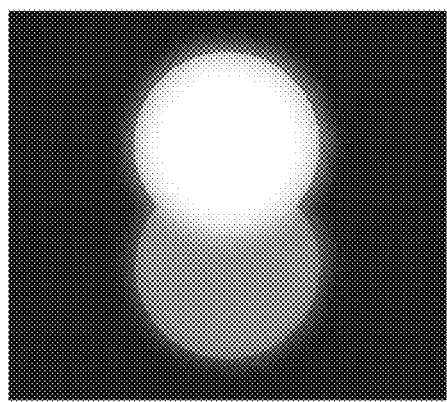
FIG. 3
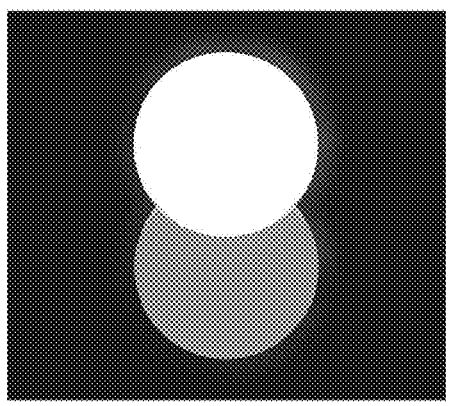
FIG. 4
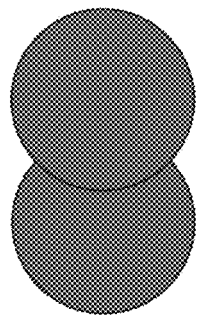
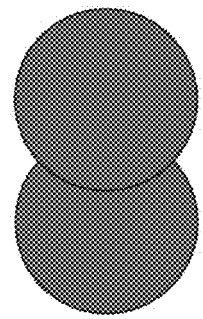

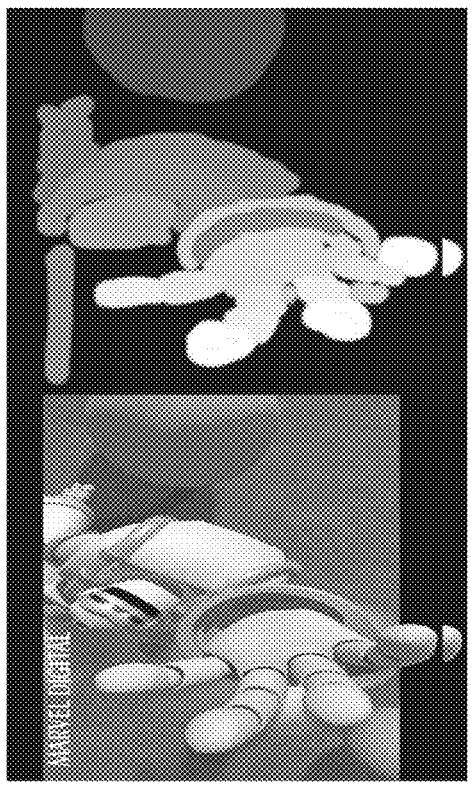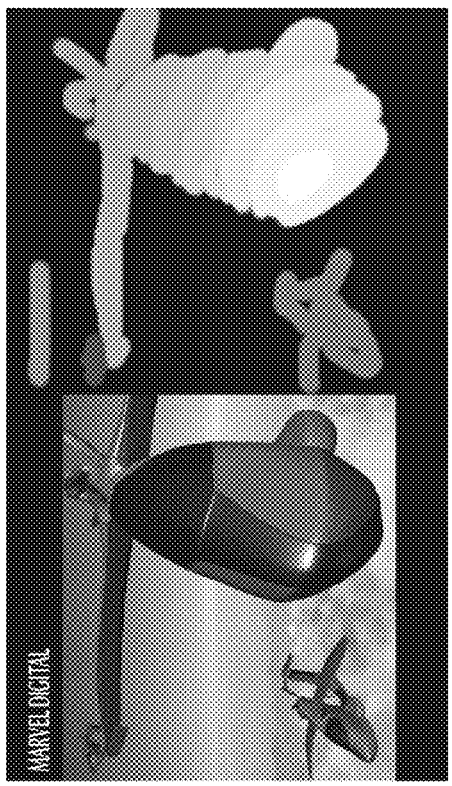
FIG. 13A
FIG. 13B

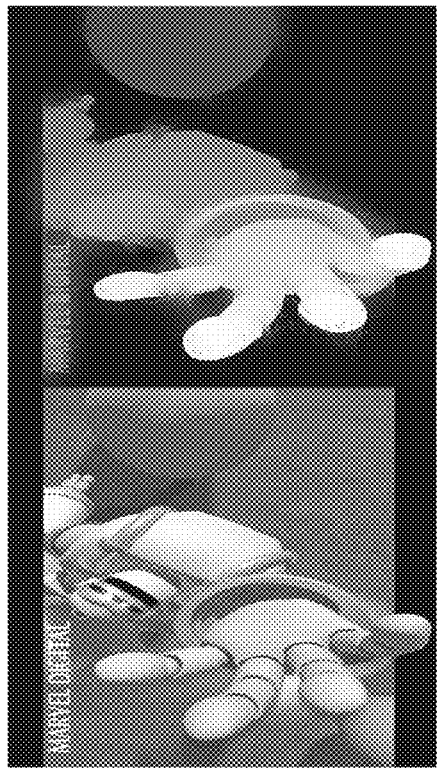 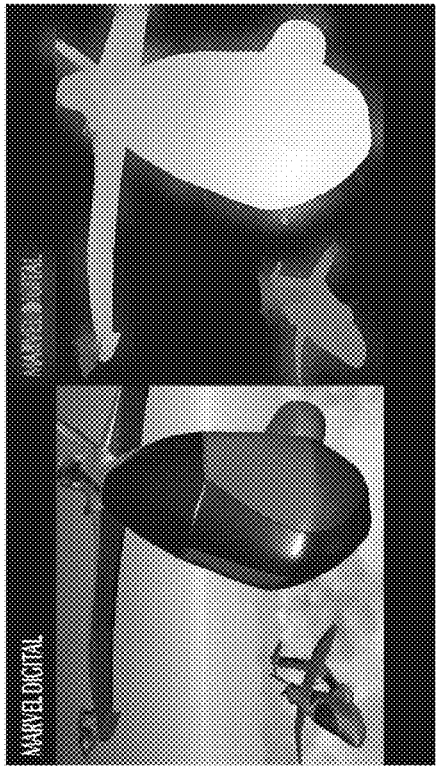
FIG. 17A
FIG. 17B

METHOD AND A SYSTEM FOR GENERATING DEPTH INFORMATION ASSOCIATED WITH AN IMAGE

TECHNICAL FIELD

The present invention relates to a method and a system for generating depth information associated with an image, and particularly, although not exclusively, to a method and a system for refining a depth map associated with an image.

BACKGROUND

Human vision involves a left eye and a right eye for receiving light of a scene from the environment or a display source. In general, the view angle of the left eye is slightly offset from that of the right eye, thus the vision of both eyes are also slightly offset. The visual information received by the left eye and the right eye is further combined and processed by the brain such that combine visual information with the sense of depth is obtained. The sense of depth is closely related to the individual offset visions of both eyes.

Three dimensional displays of images may be implemented using different approaches. One possible approach is to adopt the stereo display technique in which slightly offset two-dimensional image may be presented separately to the left and right eye. By combining the two images in the brain, a perception of the three dimensional objects may be produced.

SUMMARY OF THE INVENTION

In accordance with a first aspect of the present invention, there is provided a method for generating depth information associated with an image, comprising the steps of: identifying a plurality of objects represented by the image, wherein each object adjacent to another object are identified by an edge arranged to substantially separate the object and the adjacent object; and generating the depth information by assigning a depth value for each of the plurality of objects, wherein the depth value is arranged to represent a distance between the object and a reference point in a three-dimensional space.

In an embodiment of the first aspect, the edge between the adjacent objects is continuous.

In an embodiment of the first aspect, the object and the adjacent object are entirely separated by the edge.

In an embodiment of the first aspect, the method further comprises the step of performing an edge detection process to identify the edge on the image.

In an embodiment of the first aspect, the edge is identified based on an intensity gradient across the plurality of objects.

In an embodiment of the first aspect, the step of performing an edge detection process further comprises the step of refining the edge by thresholding the edge identified in the edge detection process to obtain at least one strong edge and/or at least one weak edge.

In an embodiment of the first aspect, the step of refining the edge further comprises the step of selectively retaining at least one weak edge in connection with at least one strong edge.

In an embodiment of the first aspect, each of the plurality of objects includes a plurality of image pixels arranged to interconnect with each other.

In an embodiment of the first aspect, the edge is represented by a plurality of edge pixels.

In an embodiment of the first aspect, the plurality of image pixels in each of the object are disconnected from the plurality of image pixels in the adjacent object by the plurality of edge pixels therebetween.

In an embodiment of the first aspect, the method further comprises the step of labelling the plurality of image pixels in each of different objects with a plurality of labels different to each other.

In an embodiment of the first aspect, the plurality of objects are further identified based on a proximity of at least one attribute between the plurality of image pixels and a reference image pixel of the image.

In an embodiment of the first aspect, the at least one attribute includes luminance and/or colour constancy.

In an embodiment of the first aspect, the method further comprises the step of determining a kernel weight for each of the plurality of image pixels based on the proximity of the at least one attribute between the plurality of image pixels and the reference image pixel.

In an embodiment of the first aspect, the method further comprises the step of updating the kernel weight of the image pixel to zero when upon the corresponding image pixel is determined to be excluded from the object that the reference image pixel belongs to.

In an embodiment of the first aspect, the method further comprises the step of processing a plurality of portions of the image with a sliding window arranged to define each of the plurality of portions of the image; wherein the sliding window is arranged to move across the image, and the plurality of objects are substantially separated by the edge between the adjacent objects and/or a plurality of boundaries of the sliding window.

In an embodiment of the first aspect, the reference image pixel is a center pixel in each of the plurality of portions of the image.

In an embodiment of the first aspect, the depth value assigned to each of the plurality of objects is based on source depth information associated with the image.

In an embodiment of the first aspect, the source depth information includes a resolution lower than or equal to that of the depth information being generated.

In an embodiment of the first aspect, the depth information includes a depth map associated with the image.

In accordance with a second aspect of the present invention, there is provided a system for generating depth information associated with an image, comprising: a segmentation module arranged to identify a plurality of objects represented by the image, wherein each object adjacent to another object are identified by an edge arranged to substantially separate the object and the adjacent object; and a processing module arranged to generate the depth information by assigning a depth value for each of the plurality of objects, wherein the depth value is arranged to represent a distance between the object and a reference point in a three-dimensional space.

In an embodiment of the second aspect, the edge between the adjacent objects is continuous.

In an embodiment of the second aspect, the object and the adjacent object are entirely separated by the edge.

In an embodiment of the second aspect, the segmentation module comprises an edge detector arranged to identify the edge on the image.

In an embodiment of the second aspect, the edge is identified based on an intensity gradient across the plurality of objects.

In an embodiment of the second aspect, the edge detector is further arranged to refine the edge by thresholding the edge identified by the edge detector to obtain at least one strong edge and/or at least one weak edge.

In an embodiment of the second aspect, the edge detector is further arranged to retain the at least one weak edge in connection with the at least one strong edge.

In an embodiment of the second aspect, each of the plurality of objects includes a plurality of image pixels arranged to interconnect with each other.

In an embodiment of the second aspect, the edge is represented by a plurality of edge pixels.

In an embodiment of the second aspect, the plurality of image pixels in each of the object are disconnected from the plurality of image pixels in the adjacent object by the plurality of edge pixels therebetween.

In an embodiment of the second aspect, the segmentation module is arranged to label the plurality of image pixels in each of different objects with a plurality of labels different to each other.

In an embodiment of the second aspect, the processing module is arranged to identify the plurality of objects based on a proximity of at least one attribute between the plurality of image pixels and a reference image pixel of the image.

In an embodiment of the second aspect, the at least one attribute includes luminance and/or colour constancy.

In an embodiment of the second aspect, the processing module is further arranged to determine a kernel weight for each of the plurality of image pixels based on the proximity of the at least one attribute between the plurality of image pixels and the reference image pixel.

In an embodiment of the second aspect, the processing module is further arranged to update the kernel weight of the image pixel to zero when upon the corresponding image pixel is determined to be excluded from the object that the reference image pixel belongs to.

In an embodiment of the second aspect, the processing module is further arranged to process a plurality of portions of the image with a sliding window arranged to define each of the plurality of portions of the image; wherein the sliding window is arranged to move across the image, and the plurality of objects are substantially separated by the edge between the adjacent objects and/or a plurality of boundaries of the sliding window.

In an embodiment of the second aspect, the reference image pixel is a center pixel in each of the plurality of portions of the image.

In an embodiment of the second aspect, the depth value assigned to each of the plurality of objects is based on source depth information associated with the image.

In an embodiment of the second aspect, the source depth information includes a resolution lower than or equal to that of the depth information being generated.

In an embodiment of the second aspect, the depth information includes a depth map associated with the image.

BRIEF DESCRIPTION OF THE DRAWINGS

Embodiments of the present invention will now be described, by way of example, with reference to the accompanying drawings in which:

FIG. 1 shows a 2D+Z image where the depth map is ground truth;

FIG. 2 shows a 2D+Z image where the depth map is noisy;

FIG. 3 shows a 2D+Z image where the noisy depth map is refined using the bilateral filtering;

FIG. 4 shows a 2D+Z image where the noisy depth map is refined using the connectivity-based filtering;

FIGS. 13A and 13B show two 2D+Z examples before depth map refinement;

FIGS. 17A and 17B show two 2D+Z examples of FIGS. 13A and 13B after refinement using the proposed connectivity-based filtering based on local connectivity analysis scheme.

DETAILED DESCRIPTION OF THE PREFERRED EMBODIMENT

Figure 5:
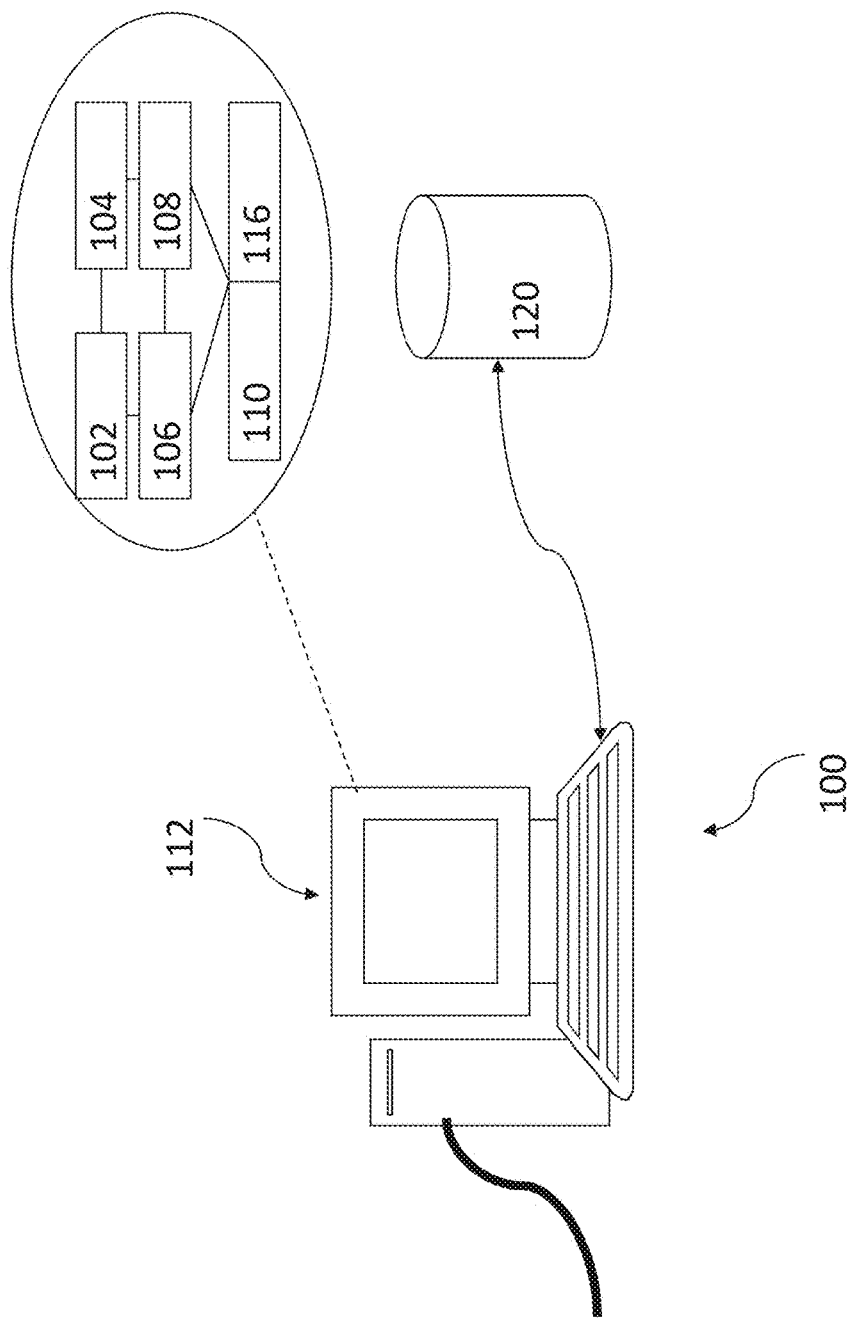
FIG. 5 shows a schematic diagram of a computing server for operation as a system for generating depth information associated with an image in accordance with one embodiment of the present invention.

The inventors have, through their own research, trials and experiments, devised that the successful adoption of 3D device depends not only on the advancement in the quality of 3D display but also on the availability of a wide range of 3D video contents. Accordingly, the popularity of 3D device may be boosted by providing 3D video contents with high quality.

The production of 3D video content may adopt different approaches. An example is 3D shooting by using stereoscopic camera rig. Another example is 2D shooting with depth capturing or manually depth map creation for 2D-to-3D conversion. Stereoscopic camera rig is a device used for mounting two cameras together to one 3D-system in order to capture two separate images for both the left eye and the right eye, hence creating 3D visual effect. As for the 2D shooting approach, 2D imaging is adopted and the corresponding depth information is captured by depth camera or created by "depth artists" who manually create the depth map for each frame at the post-processing stage.

The original 2D image may be combined with per-pixel depth map information forms 2D-plus-Depth (also called 2D+Z) image, which is a stereoscopic video coding format. Standard Depth Image-Based Rendering (DIBR) algorithms may then be used to synthesize the other views for 3D displays. In comparison, the professional stereoscopic camera rig used in 3D shooting may be more expensive and bulky than the traditional 2D camera. In terms of the difficulty on the live-action capturing and post-processing, the 3D shooting workflow is more complicated. Therefore, 2D shooting approach is relatively flexible because the depth map can be further modified or processed for certain requirements.

Another advantage is that a large number of older popular films based on 2D shooting may be converted to 3D through this approach. In order to speed up the production and have a superior quality control of 3D video, 2D-to-3D conversion may be a better solution to meet the demands of the 3D production industry.

Although 2D shooting has a number of advantages over the 3D shooting, there may be some problems with depth camera and manually 2D-to-3D conversion respectively. In general, the resolution and precision of depth map captured by depth camera may be much lower than that of the 2D image, thus the alignment between 2D image and depth map is not good enough for direct Depth Image-Based Rendering (DIBR). As for the manual 2D-to-3D conversion, the alignment may be better it may require intensive human effort. In practice, with the purpose of cost reduction for depth map creation, the depth map may be generated using two techniques, namely "Fully-automatic 2D-to-3D conversion" and "Semi-automatic 2D to 3D conversion".

In fully-automatic 2D-to-3D conversion, the depth map is estimated based on certain image features without human intervention. For example, the depth map may be generated according to edge, color, blur, occlusion, vanishing point, motion, and scene change analysis.

On the other hand, semi-automatic 2D-to-3D conversion may involve certain human intervention under the assistance of the machine computation. For example, the user may select a small amount of key frames for manual depth map creation, which may be referred as rotoscoping. Then the depth map information of key frame is used and propagated to generate the depth map of non-key frames based on the information of 2D image. For example, the depth spread is achieved by depth-color bilateral filtering using the color and depth information to calculate values for unknown depth pixels in the propagated depth image.

In another example, the depth propagation from one frame to the other frames in the same shot may involve a segmentation technique. Alternatively, image matching method between key frame and non-key frame may be used by matching the height of the pixels that match the reliability value larger pixel.

In a bi-directional depth propagation method, i.e. both forward and backward propagation, bilateral filtering in a first step and motion estimation in a second step may be used.

Depending on different requirements, such as conversion speed, quality as well as flexibility, fully-automatic or semi-automatic 2D-to-3D conversion may be chosen to handle different video contents. Both methods are effective for 2D-to-3D conversion, however, the estimated or propagated depth map of both methods may suffer from the low-resolution problems. The term "low-resolution" refers to the depth map which may suffer from the following problems:

1). The horizontal and vertical number of pixel of depth map may be lower than that of 2D image;
2). The pixel mapping between 2D image and depth map is rough and not well aligned;
3). The depth value, especially the pixel around the object, may be noisy and not correct.

For fully-automatic 2D-to-3D conversion, the depth map may be estimated based on some image features such as edge, blur, vanishing point, motion, etc. The main problem is that the success rate of estimation may not be high and stable. Besides, since some image feature calculations are obtained by window-based analysis at non-pixel level precision, the generated depth map is relatively rough and the alignment between the depth map and the high resolution 2D color image is commonly poor.

For semi-automatic 2D to 3D conversion, the manually created depth map of key frame is generally in high resolution and have good alignment with the 2D color image. However, the depth map of non-key frame, which may be generated based on the depth propagation algorithm such as motion estimation in macroblock level, may be in a lower resolution compared to that of key frame. In addition, if a color or an object exist in non-key frame but not present in the key-frame image, there is no information for motion estimation and the depth value cannot be associated. As a result, motion estimation may fail to predict the depth value for non-key frame. Therefore, it is hard to obtain a great alignment between the depth map and 2D color image of non-key frame.

The estimated depth map of non-key frame may be used to estimate another depth map of further non-key frames. If error is generated in the early stage, it may be accumulated and may propagate to other frames. Therefore, depth map refinement is a very important process to minimize the error of the estimated depth map before substantial error propagation.

Thus, no matter which method of 2D-to-3D conversion is adopted, the common problem is that the generated depth map may be noisy, low-resolution and not detailed enough for depth image based rendering (DIBR) processing.

In one example embodiment, a low-resolution depth map may be upscale to a resolution being the same as that of 2D image by applying a bilateral filter for resolution enhancement and depth map refinement.

In this example, a bilateral filter is a non-linear, edge-preserving and smoothing filter for images. The intensity value at each pixel in an image is replaced by a weighted average of intensity values from nearby pixels. The weight depends not only on Euclidean distance of pixels, but also on the range differences, such as color intensity. Applying bilateral filtering for depth map refinement implies that the nearby pixels with similar color intensity should have similar depth values. However, this assumption is always violated.

For example, two individual objects with exactly same appearance are placed nearby but at different depth level. With reference to FIGS. 1 and 2, there is shown examples of a ground truth and noisy depth map respectively. Referring to FIG. 3, a bilateral filter may be applied to refine the noisy depth map according to the intensity similarity and the distance from nearby pixels, the depth value of these two individual objects will affect each other and cause depth blurring and ambiguity problem.

With reference to FIG. 4, in order to solve depth blurring and ambiguity problem, a depth map refinement unit may be used to improve boundary accuracy, to reduce the noise as well as to increase the resolution of the depth map based on the information of 2D color image, depth map and edge. Accordingly, a sequence of low-resolution depth map may be converted to high-resolution depth map automatically, and thus high quality 3D video may be efficiently produced.

With reference to FIG. 5, an embodiment of the present invention is illustrated. This embodiment is arranged to provide a system for generating depth information associated with an image, by identifying a plurality of objects represented by the image, wherein each object adjacent to another object are identified by an edge arranged to substantially separate the object and the adjacent object; and generating the depth information by assigning a depth value for each of the plurality of objects, wherein the depth value is arranged to represent a distance between the object and a reference point in a three-dimensional space.

Preferably, in one example, the system may receive an input image, and after processed by different image processing modules in the system, the depth information of the input image may be provided by the system as an output. These image processing modules may be preferably implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 5, there is a shown a schematic diagram of a computer or a computing server 100 which in this embodiment comprises a server 100 arranged to operate, at least in part if not entirely, the system for generating depth information associated with an image in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100. Alternatively, the database 120 may also be implemented as a stand-alone database system in communication with the server 100 via an external computing network, or other types of communication links.

The server 100 may be implemented with instructions or software codes which may be executable by the processor such that the server 100 may be used for generating and/or processing depth information (or other information) associated with an image. Alternatively, the server 100 may include suitable hardware or combine with other hardware so as to generate depth information associated with an image.

Figure 6:
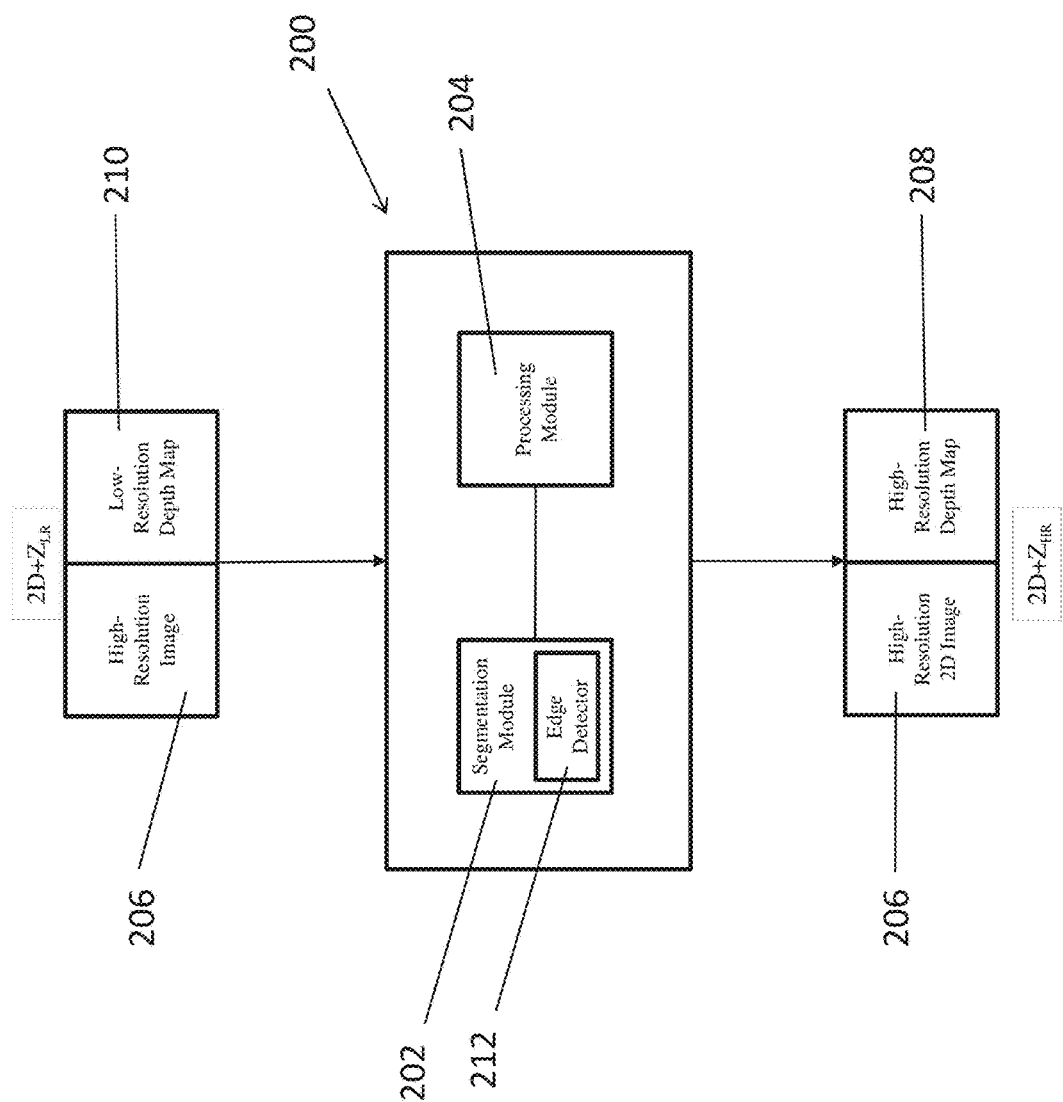
FIG. 6 shows a high level functional block diagram of the system for generating depth information associated with an image in accordance with one embodiment of the present invention.

With reference to FIG. 6, there is shown an embodiment of the system 200 for generating depth information associated with an image. In this embodiment, the server 100 is used as part of the system 200 implemented as a segmentation module 202 and/or a processing module 204. The segmentation module 202 and the processing module 204 are arranged to cooperate to process an image 206 so as to generate depth information 208 associated with the image 206.

In this example embodiment, the system 200 comprises a segmentation module 202 arranged to identify a plurality of objects represented by the image 206, wherein each object adjacent to another object are identified by an edge arranged to substantially separate the object and the adjacent object; and a processing module 204 arranged to generate the depth information 208 by assigning a depth value for each of the plurality of objects, wherein the depth value is arranged to represent a distance between the object and a reference point in a three-dimensional space.

As discussed above, different objects represented on the image 206 may be positioned with different distances within a three-dimensional space. Therefore, depth information 208 including different depth values may be assigned to different objects in the image 206 such that the depth value may represent a distance between the objects and a reference point (such as a point on a two-dimensional display plane) in a three-dimensional space. Alternatively, the depth values may be used to provide other information such as locational and/or geographical information associated with the objects. The depth information may include a depth map associated with the image.

Preferably, a plurality of objects may be identified by the segmentation module 202 according to the edges determined in the image 206. Thus, an object and an adjacent object being substantially or entirely separated by the edge(s) may be identified as two different objects. The processing module 204 may then assign different depth values to each of the different objects identified by the segmentation module 202. The segmentation module 202 may further comprise an edge detector 212 arranged to identify the edge(s) on the image 206 for further processing.

Preferably, the edge detector 212 may include a Canny edge detector which may link up the high gradient points and perform edge thinning to form a more complete and reliable description of an edge, for example by performing a non-maximum suppression process to the edge detected. Under general assumptions for an image formation, discontinuities in image brightness may correspond to discontinuities in depth. The edge detection results may facilitate the segmentation module 202 to identify different objects so as to improve the generation of depth information. More detail explanations and discussion will be included in the later portions of this disclosure.

For example, an image 206 may be processed by the segmentation module 202. The edge detector 212 may identify edges associated with the objects on the image 206, such that the segmentation module may identify different individual objects separated by the edges. Then the processing module 204 may assign different depth values to different objects in the original high resolution image based on the source depth map 210 with a low resolution, thus generating a high resolution depth map 208 associated with the high resolution 2D image 206.

With reference to FIG. 6, there is shown an input of 2D+Z image with high-resolution 2D image 206 but low-resolution depth map 210. The system may be used as a depth map refinement unit which may adjust the depth value according to the high-resolution 2D image 206 information. After processing, an output of 2D+Z image with high-resolution 2D image 206 and high-resolution depth map 208 may be obtained for further processing, such as depth-image based rendering (DIBR). Preferably, the refined depth map may be noise reduced and may represent more details, especially around the object boundary area.

Figure 7:
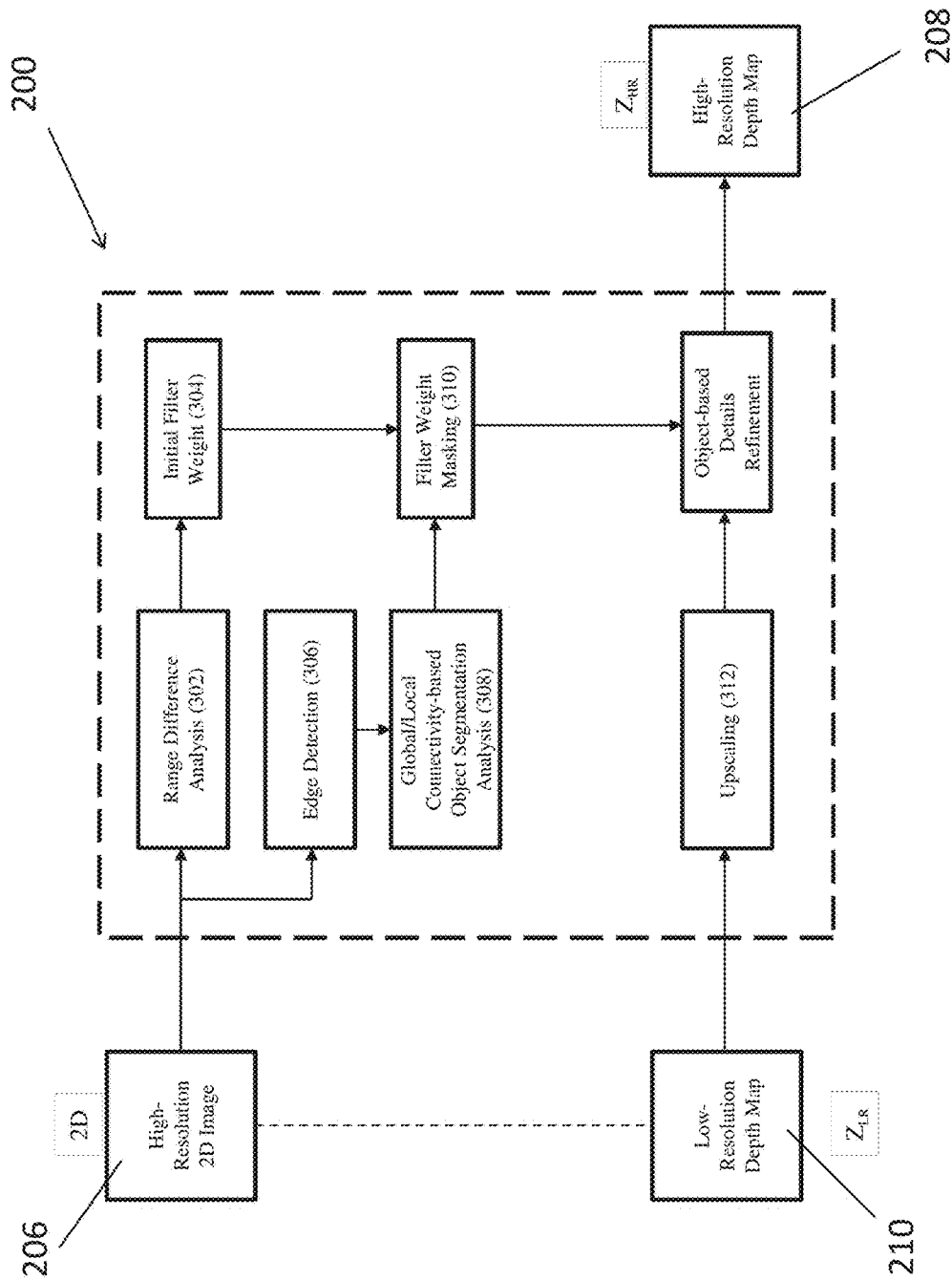
FIG. 7 shows a flow diagram of an example operation of intensity and connectivity-based analysis providing object segmentation information for depth map filtering in accordance with one embodiment of the present invention.

With reference to FIG. 7, there is shown a flow diagram of an example operation of the system 200 for intensity and connectivity-based analysis providing object segmentation information for depth map refinement.

In this example operation, the system 200, which may be used as a depth map refinement unit. The processing module 204 may operate as a range filter which analyzes a size of N×N sliding window in the 2D image 206 to determine the kernel weights for use in refining the value of depth map. In the range difference analysis step 302, the weights of range filter may depend on the range difference from nearby pixels in the 2D image 206. The intensity or color information to be used to calculate the range difference, including but not limit to YUV, YCbCr, RGB, HSV, HSL, etc. Based on the object luminance or color constancy assumption that for those pixels belong to the same object should have similar color and implies they should have similar depth values. The smaller the range difference from the nearby pixel, the higher the weight in the kernel for that nearby pixel. Preferably, the weights may be linear or non-linear in relation to the range difference.

In one example, the color similarity may be processed by calculating the range difference within a window which is defined as:

$$\|I(x_i,y_i)-i(x,y)\|, x_i \text{ and } y_i \in \Omega$$

I is the intensity of 2D image to be analyzed;

x and y are the coordinates of the current pixel to be filtered;

$x_i$ and $y_i$ are the coordinates of the neighboring pixel within the window;

$\Omega$ is the window centered in x,y.

The initial filter weight 304 can be a linear or non-linear function of the range difference. It can be expressed as:

$$R(x_i,y_i)=f_r\|I(x_i,y_i)-i(x,y)\|$$

$f_r$ is the kernel for linear or non-linear transformation on the range differences.

One of the possible implementations of the transfer function is the use of Gaussian kernel which can be expressed as:

$$R(x_i, y_i) = e^{-\left(\frac{\|D(x_i,y_i)\|^2}{2\sigma_r^2}\right)},$$

where $\sigma_r$ is a parameter which controls the degradation of curve. As the range parameter $\sigma_r$ increases, the degradation is slower.

Figure 8A:
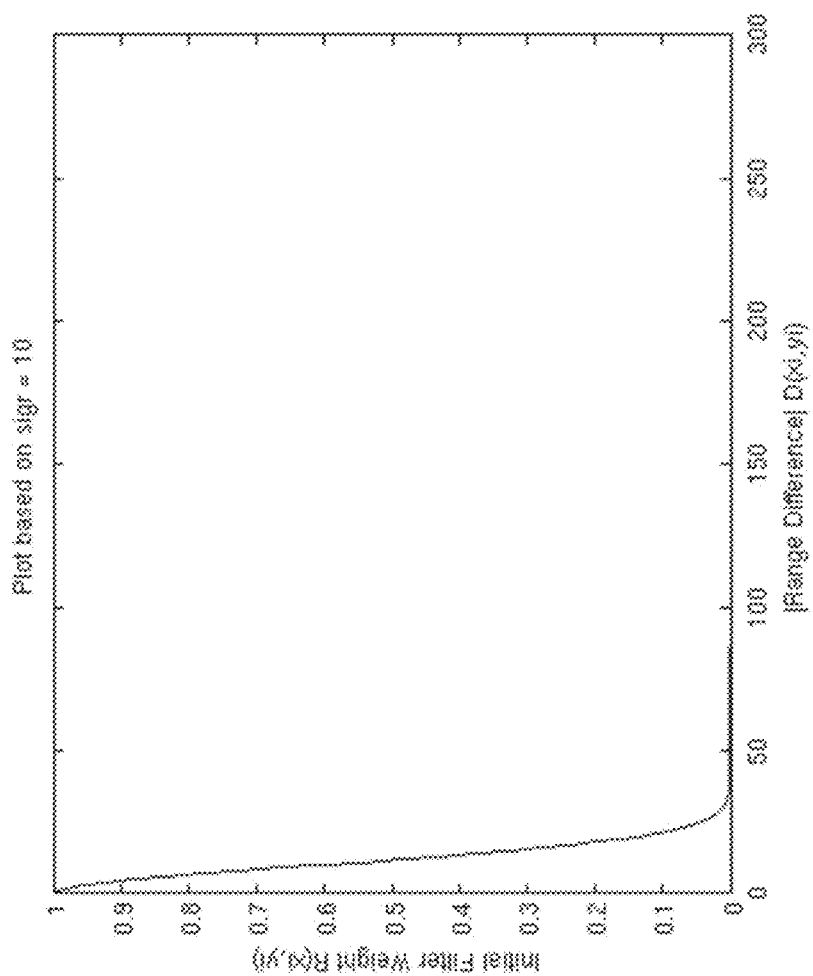
FIGS. 8A and 8B show plots of the examples of two transfer functions associated with the Gaussian kernel, with $\sigma_r=10$ and $\sigma_r=20$ respectively.
Figure 8B:
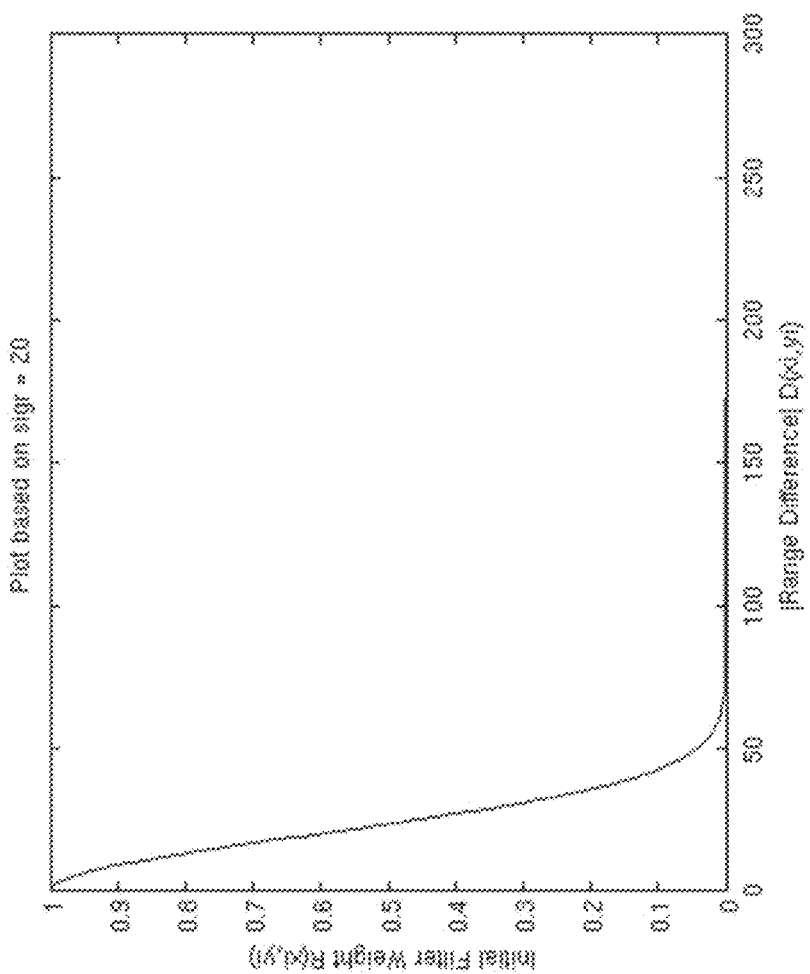

With reference FIGS. 8A and 8B, there is shown the examples of two transfer functions, with $\sigma_r=10$ and $\sigma_r=20$ respectively. No matter what transfer function is used, the smaller the range difference, the higher the initial filter weight. The idea behind the initial filter weight is that for those pixels which have similar intensity to that of the center pixel, they have higher probability that they belong to the same object.

Preferably, the range differences analysis may determine the magnitude of filter weight from each neighboring pixels.

However, as mentioned before, pixels with similar color doesn't mean they necessarily belong to the same object. Extra information may be needed to distinguish those pixels with similar color from different objects. By observation on the general 2D image, including real-world image and animation, one important feature which can be used to segment the objects is edge. Edges are the points where there is a boundary between two image regions. In computer vision/graphics, edges may be typically defined as sets of points in the image which have a sharp brightness change or strong gradient magnitude.

Referring back to FIGS. 6 and 7, the system 200 or the depth map refinement unit comprises an edge detector 212 arranged to analysis the 2D image 206 to generate an edge map with the same resolution as the 2D image 206 in an edge detection process 306. Preferably, the edge detector 212 may include Canny, Deriche, Differential, Sobel, Prewitt and/or Roberts edge detector for identifying the edges on the image 206, and the edge may be identified based on an intensity gradient across the plurality of objects.

Preferably, the edge detector 212 may be further arranged to refine the edge(s) identified in the edge detection process 306. For example, by thresholding the detected edge(s) by one or more passes so as to obtain at least one strong edge and/or at least one weak edge. The strong and weak edges may contribute portions of edges for further processing.

The edge detector 212 may be further arranged to retain the at least one weak edge in connection with the at least one strong edge, i.e. the weak edge which is not connected to a strong edge may be discarded in an edge tracking process. In addition, the edge detection may be further improved by applying a smoothing filter to the image 206 for noise removal prior to the determination of the edges on the image 206.

Figure 9:
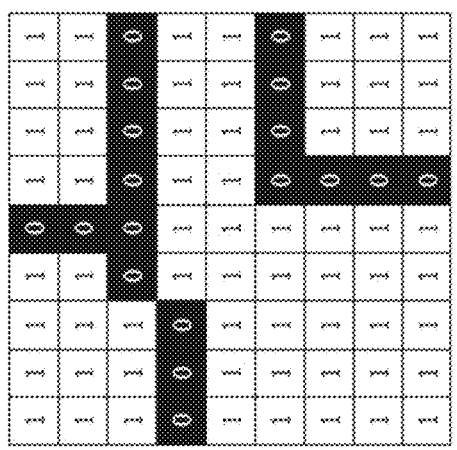
FIG. 9 shows an example of a 9×9 edge map. The "0" or "1" values in the center of the elements are elements' values where "0" means edge pixel, and "1" means non-edge pixel.

With reference to FIG. 9, the edges may be represented by a plurality of edge pixels. In this example, a binary edge map may be obtained after the edge detection 306, which may be expressed as:

$$(x, y) = \begin{cases} 0, & \text{if } e(x, y) \text{ is an edge pixel} \\ 1, & \text{if } e(x, y) \text{ is a non edge pixel} \end{cases},$$

in which a non-edge pixel is an image pixel representing a portion of an object. An object may include a plurality of image pixels which interconnect with each other, however, the image pixels in an object are disconnected from any image pixels in an adjacent object by the plurality of edge pixels in between as the edge between the adjacent objects is continuous.

Figure 10:
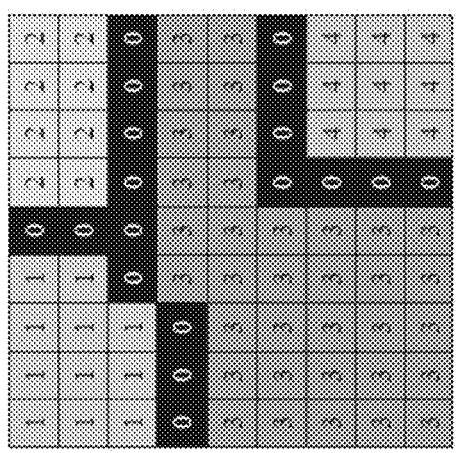
FIG. 10 shows the corresponding object label map (4-connectivity based) of FIG. 9, wherein the "1, 2, 3, 4" values in the center of the elements are the elements' object labels.

Given the binary edge map, the task of object segmentation is accomplished by connected-component labeling algorithm. With reference to FIG. 10, connected-component labeling is used to detect connected regions in binary edge map. Each connected region is composed of a set of non-edge pixels e(x,y)=1 which must exist a connected path to each other. Different connected regions are isolated by edge pixels e(x,y)=0 since no connected path exist can be found in between. The adopted connectivity strategy is 4-connectivity because it is more accurate to analyze the connected regions enclosed by thin edge.

Since different individual objects may be clearly defined based on the connectivity analysis, the segmentation module 202 may then label the plurality of image pixels in each of the different objects with a plurality of labels different to each other. Referring to FIG. 10, all non-edge pixels that can form a connected group are defined as a connected-component. The edge pixels are marked with "0" and image pixels in different objects were marked with "1", "2", "3" and "4" respectively.

To achieve connectivity analysis, a Connected-Component-Labeling method may be adopted. The inputs are the binary edge map and the preferred type of connectivity method (4-connected or 8-connected) and the output is a Connected-Component-Label map (CCL map) where each object will be assigned a unique label number. The elements of label map are integer values. The pixels labeled as 0 are the edge. The pixels labeled as 1 make up one object; the pixels labeled as 2 make up another object; and so on until all non-edge pixels have been assigned an object label number.

In one example embodiment, the Connected-Component-Labeling method may include a two-pass approach based on 4-connectivity method. 4-connectivity means that only the horizontal (left and right) and vertical (up and down) neighbors are evaluated. The following are the detailed steps of the method used in the example:

On the first pass, the process begins with a raster scan through each element of the input edge map by column, then by row. If the element is not the edge, get the neighboring elements of the current element; if there exist no non-edge neighbor, uniquely and temporarily give a new label to the current element and continue; if there is non-edge neighbor, find the neighbor with the smallest label and assign it to the current element. Finally, the equivalence between neighboring labels is stored. Equivalence means two or more temporary labels actually represent the same object.

On the second pass, the process begins with a raster scan through each element of the data by column, then by row. If the element is not the edge, the element with the lowest equivalent label is relabeled.

Preferably, each connected-component is assigned a unique label which can be identified as an individual object, and each object is separated and bounded by edge or image boundary. As a result, each pixel will be assigned a static object label number. Alternatively, the image and/or the edge pixels may be labeled with different labels or representations.

Returning to FIG. 7, after the edge detection step 306, the processing module 204 may continue the process with a connectivity-based object segmentation analysis 308, which may include a global connectivity analysis based on the whole edge map of the entire image 206 and a local connectivity analysis based on an edge map of a portion of the image 206 partitioned by a sliding window moving across the image 206.

In a global connectivity analysis, a one-off Connected-Component Labeling is performed based on the full-sized edge map before starting the window-based filtering process.

One possible advantage is that the one-off connected-component labeling process can be pre-computed before image filtering so that the computation loading for connected-component labeling can be significantly reduced. During image filtering, the connected-component label within the window may be directly looked up from the pre-computed map. Without repeatedly computing the connected-component label for every step of filtering, the processing speed is fast.

However, the quality of connected-component labeling/object segmentation may depend highly on the result of edge detection. If there is any small hole or edge discontinuity due to imperfect edge detection, the pixels originally belong to different objects will be determined as the same object because a connected path exist between them. Such error can affect the result of connected-component labeling for a large number of pixels. With incorrect object segmentation, the effectiveness of depth map refinement will be degraded.

Preferably, in a local connectivity analysis, a sliding window may be created and the sliding window scans through the image 206 step by step. The static object label number can be directly looked up for filter weight masking. Individual Connected-Component Labeling based on the window-sized edge map within the window-based filtering process may be performed accordingly.

The sliding window may define each of the plurality of portions of the image, and the plurality of objects are substantially separated by the edge between the adjacent objects and/or a plurality of boundaries of the sliding window.

The local connectivity analysis may be based on a much smaller edge map within the sliding window. The temporary object label number is immediately computed for each step of sliding window. A set of non-edge pixels that can form a connected group is defined as a temporary connected-component. Each temporary connected-components then assigned a temporarily unique label which can be identified as an individual object. Each object is separated and bounded by edge or window boundary. The temporary object label number is used for filter weight masking at that particular step only. For each step of sliding window analysis, the temporary object label number has to be computed again.

One possible advantage of the local analysis is that every step only a small portion of image 206 is evaluated for connected-component labeling. If there is any hole or edge discontinuity due to imperfect edge detection, it only affects the result of connected-component labeling for a small number of pixels. It means that the impact of imperfect edge detection can be significantly reduced. In general, the performance of object segmentation and depth map refinement of local scheme is superior to the global scheme.

However, the computation loading may be heavy comparing to the global scheme since the result of connected-component labeling varies with every step of analysis window. Thus the processing time will be longer in general.

Preferably, based on the results obtained by the global analysis, a local connectivity analysis may be applied to obtain an improved result of the connectivity-based object segmentation analysis. The results may be evaluated based on an evaluation process such as an analysis of the edges obtained in the image 206 or the quality of the objects identified in the image 206 by the global analysis. The evaluation process may be performed by an evaluation module or may involve human intervention.

Figure 11:
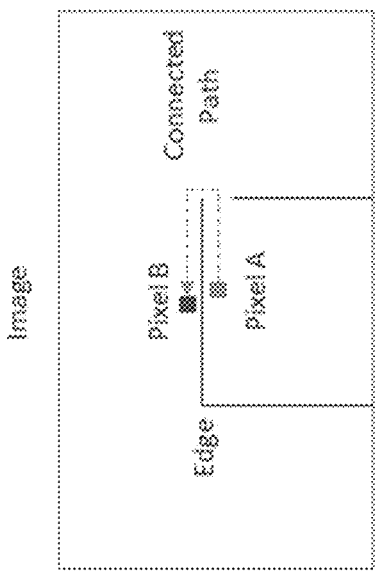
FIG. 11 shows an example of continuity between two pixels under global connectivity analysis.

With reference to FIG. 11, the global analysis method may save a lot of computation, the drawback is that object segmentation may fail if the edge contour is discontinuous or an edge hole exists which leads two different objects may connect together.

Figure 12:
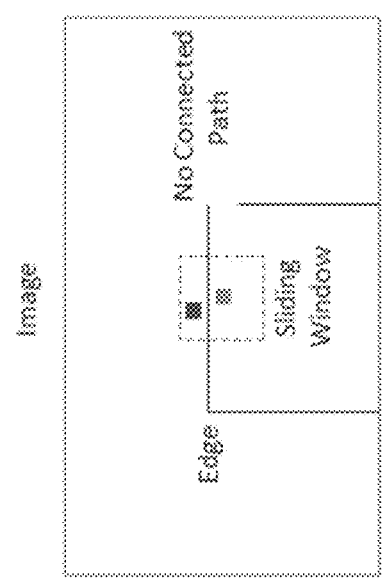
FIG. 12 shows an example of discontinuity between two pixels under local connectivity analysis.
Figure 14A:
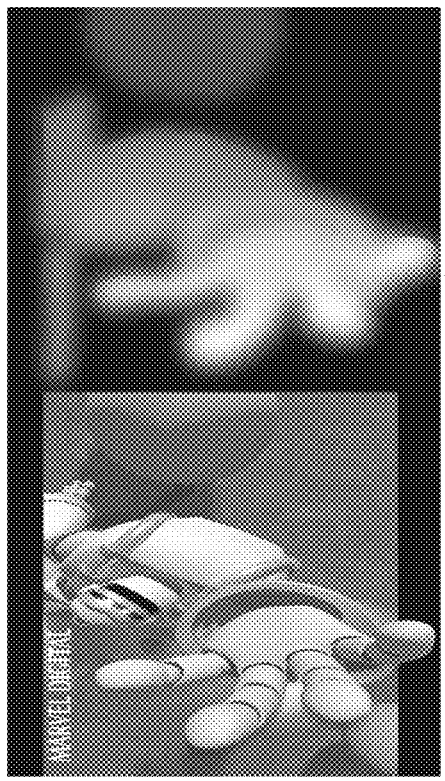
FIGS. 14A and 14B show two 2D+Z examples of FIGS. 13A and 13B after refinement using bilateral filtering.
Figure 14B:
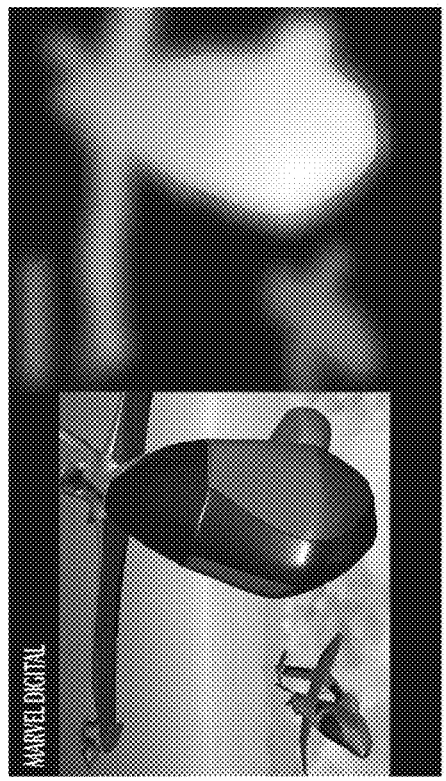
Figure 15A:
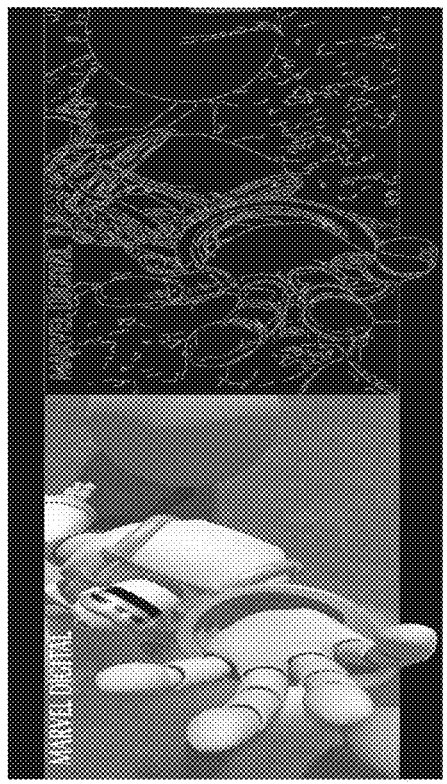
FIGS. 15A and 15B show the edge map of the corresponding 2D image based on Canny edge detector.
Figure 15B:
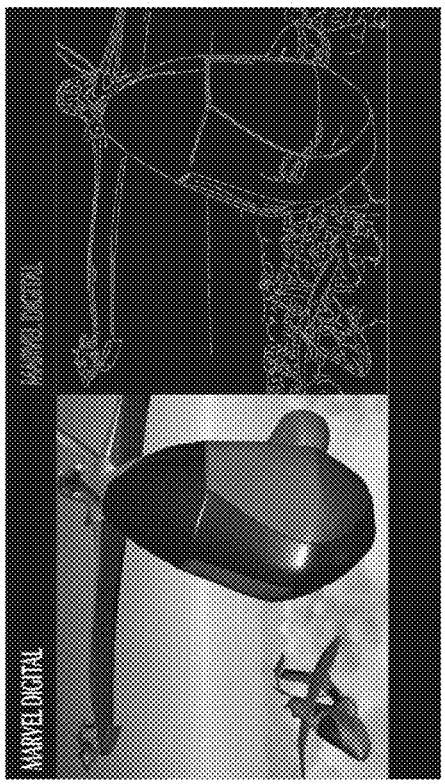
Figure 16A:
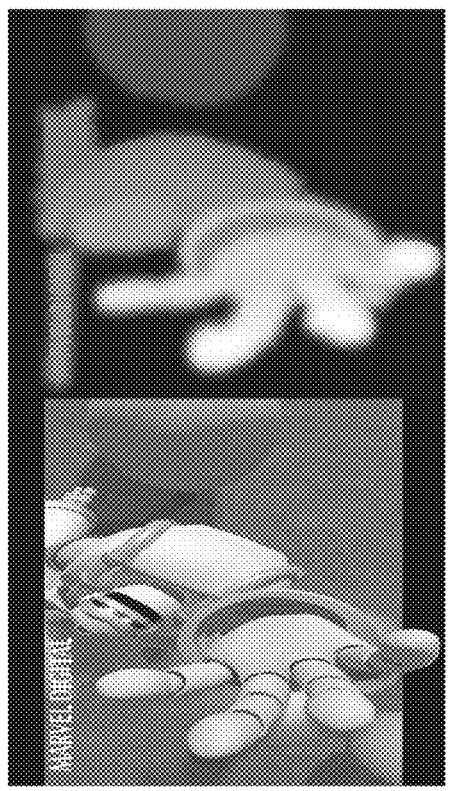
FIGS. 16A and 16B show two 2D+Z examples of FIGS. 13A and 13B after refinement using the proposed connectivity-based filtering based on global connectivity analysis scheme.
Figure 16B:
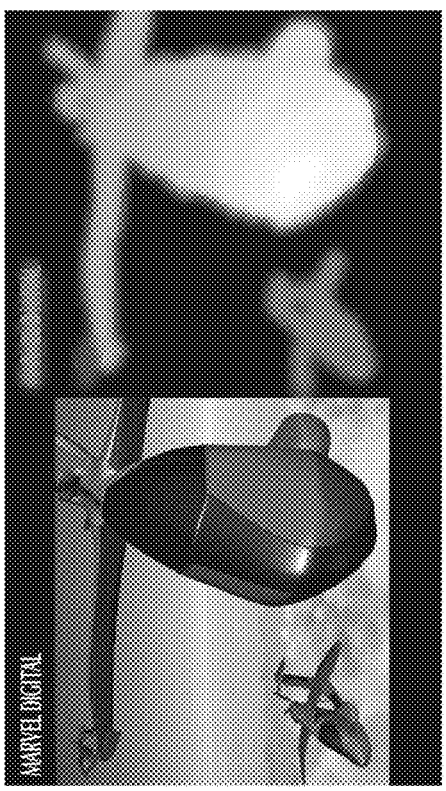

With reference to FIG. 12, the local connectivity analysis may provide an alternative to address the drawback of global connectivity analysis. The local connectivity analysis only looks for a much smaller region within sliding window, the object segmentation is still effective for most of small region and only fail around the discontinuous edge contour. The advantage of local analysis is that the object isolation by edge is superior due to less edge discontinuity or hole seen within small window content. However, since the connected-component labeling have to be updated each step of sliding window while filtering, the computation time would be longer than that of the global scheme.

Preferably, the processing module 204 is arranged to identify the plurality of objects based on a proximity of at least one attribute, such as luminance and/or color constancy, between the plurality of image pixels and a reference image pixel of the image. Based on the proximity of the attributes between the plurality of image pixels and the reference image pixel, the processing module may determine a kernel weight for each of the plurality of image pixels.

Preferably, in a global analysis, the center pixel of the image may be defined as the reference image pixel. In a local analysis, the center pixel of the portion of the image defined by the sliding window may be defined as the reference image pixel.

With reference to FIG. 7, the processing module 204 may further arranged to continue the process with a filter weight masking process 310. The initial filter weight 304, generated by the range difference analysis 302 from 2D image 206 in an earlier processing stage, may be masked according to the object segmentation result. The term 'masking' refers to modify one or more weight(s) of nearby pixel(s) to zero if the connected-component label of the center pixel or the reference image pixel of the image is different to that of nearby pixels. If two pixels have different object labels, it means they belong to different object and their depth value should not affect each other while refinement process, i.e. the kernel weight of the image pixel is updated to zero when upon the image pixel is determined to be excluded from the object that the reference image pixel or the center pixel belongs to.

For both global and local schemes of connectivity analysis 308, the object label of each pixel $L(x_i,y_i)$ may be obtained. For those neighboring pixels which object label is not the same as that of the pixel located at the window center $L(x,y)$, their filter weight will be masked. The masking matrix is defined as:

$$M(x_i, y_i) = \begin{cases} 0, & \text{if } L(x_i, y_i) \neq L(x, y), x_i \text{ and } y_i \in \Omega \\ 1, & \text{if } L(x_i, y_i) = L(x, y), x_i \text{ and } y_i \in \Omega \end{cases}.$$

Given the initial filter weight $R(x_i,y_i)$ and the corresponding masking matrix $M(x_i,y_i)$, the final convolution kernel $G(x_i,y_i)$ may be expressed as the point-by-point multiplication of $R(x_i,y_i)$ and $M(x_i,y_i)$, i.e. $G(x_i,y_i)=R(x_i,y_i) M(x_i,y_i)$ Preferably, the depth value assigned to each of the plurality of objects is based on source depth information 210 associated with the image 206. For example, the source depth information associated with the image 206 may be a low-resolution depth map 210 with reference to FIG. 2. The source depth information 210 may include a resolution lower than or equal to that of the depth information 208 being generated.

The processing module 204 of the depth map refinement unit may further arranged to process the image 206 and/or a source depth information with a upscaling process 312. The low-resolution depth map may be upscaled to a resolution where the horizontal and vertical number of pixel is equal to that of 2D image 206 for better point-by-point computation. The upscaling process 312 may include but not limited to Nearest Neighbor, Bilinear, Bicubic, and Lanczos interpolation. By using these methods, although the horizontal and vertical number of pixel may equal to that of 2D image 206, the upscaled depth map may still render blurred or blocky.

Having provided the masked filter weights, the upscaled low-resolution depth map is refined and filtered by convolving the kernel. Convolution is a process of multiplying each element of the image 206 with its local neighbors, weighted by the kernel. For example, if there are two matrices, one a kernel, and the other an image piece, convolution is the process of point-by-point multiplying both matrices and summing all results. Depending on different situations, the filtering process can be iterative and the number of iteration can be determined by user in order to get the optimal result of refinement.

Preferably, the upscaled but still low-resolution depth map $D_{LR}(x_i,y_i)$ may be filtered by convolving the kernel $G(x_i,y_i)$. The refined and high-resolution $D_{HR}(x,y)$ depth map is defined as:

$$D_{HR}(x, y) = \frac{1}{W_p} \sum_{x_i, y_i \in \Omega} D_{LR}(x_i, y_i) G(x_i, y_i),$$

where the normalization term $W_p=\Sigma_{x_i,y_i \in \Omega}G(x_i,y_i)$.

Optionally, depending on the quality of the input depth map and the setting of the refinement unit, multiple iteration of refinement may be employed to obtain the optimal refinement result.

The segmentation module 202, the processing module 204 and/or the different modules for processing the image 206 and/or the low-resolution depth map 210 in different steps 302 to 312 in the depth map refinement unit may also be implemented as (at least a portion of) a hardware processor arranged to process the image data associated with the image 206. For example, the processor may be at least one of a computer processor, an image processor, a graphics processing unit, a central processing unit, a microprocessor, an Application Specific Integrated Circuit (ASIC), a Field Programmable Gate Array (FPGA), a Programmable Logic Device (PLD), a controller, a state machine and gated logic. The processor(s) may be specially implemented to process the image so as to generate the require depth information associated with the image.

Alternatively, each of these modules may be separately implemented, and each of the modules may include a plurality of components/elements. The modules may also be implemented in software (e.g., subroutines and codes) executable by the server 100.

These embodiments may be advantageous in that the system and the method for generating depth information associated with an image may be used to refine a depth map with improved pixel-by-pixel alignment and thus provide a solution of resolution enhancement in fast and high-quality 2D-to-3D conversion.

With reference to FIGS. 13 to 17, there is shown results of the depth map refinement in accordance with the embodiment of the present invention. Referring to FIGS. 13A and 13B, there is shown two examples of original 2D+Z images. Referring to FIGS. 14A and 14B, the two "Z images" are processed using bilateral filtering. Referring to FIGS. 15A and 15B, there is shown the edge map of the 2D images obtained for use in the connectivity analysis. Referring to FIGS. 16A and 16B, the two examples of 2D+Z images are refined using a connectivity-based filtering based on global connectivity analysis. Finally, referring to FIGS. 17A and 17B, the two examples of 2D+Z images are refined using a connectivity-based filtering based on local connectivity analysis. It is illustrated that the 2D+Z image processing method based on the local connectivity analysis may provide clearer depth information than in other example methods.

Advantageously, after the depth map refinement, the low-resolution depth map may be converted to high-resolution depth map with corrected depth value and improved pixel-by-pixel alignment, thus saving a large amount of time and manual work on depth map modification. With a reliable depth map refinement unit, only a rough depth map is enough and rapidly created by user, the corresponding detailed depth map can be generated automatically.

It will be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An apparatus for use in an depth generation system, comprising:
   a storage device;
   a communication interface; and
   a processor coupled to the storage device and communicably coupled to the communication interface, the storage device storing software instructions for controlling the processor that when executed by the processor configure the processor to:
   process a request for generating depth information associated with an image;
   identifying a plurality of objects represented by the image, wherein each of the plurality of objects is identified by detecting a respective edge between adjacent objects based on an intensity gradient such that the plurality of objects adjacent to each other are substantially separated; and
   generating depth information by assigning a depth value for each of the plurality of objects, wherein the depth value is arranged to represent a distance between the plurality of objects and a reference point in a three-dimensional space.

2. The apparatus of claim 1, wherein the edge between the adjacent objects is continuous.

3. The apparatus of claim 2, wherein the object and the adjacent object are entirely separated by the edge.

4. The apparatus of claim 1, wherein detecting the edge results in obtaining at least one strong edge and/or at least one weak edge by thresholding the edge.

5. The apparatus of claim 4, wherein detecting the edge retains the at least one weak edge in connection with the at least one strong edge.

6. The apparatus of claim 1, wherein each of the plurality of objects includes a plurality of image pixels arranged to interconnect with each other.

7. The apparatus of claim 6, the edge is represented by a plurality of edge pixels.

8. The apparatus of claim 7, wherein the plurality of image pixels in each of the object are disconnected from the plurality of image pixels in the adjacent object by the plurality of edge pixels therebetween.

9. The apparatus of claim 8, wherein identifying a plurality of objects labels the plurality of image pixels in each of different objects with a plurality of labels different to each other.

10. The apparatus of claim 6, wherein generating depth information identifies the plurality of objects based on a proximity of at least one attribute between the plurality of image pixels and a reference image pixel of the image.

11. The apparatus of claim 10, wherein the at least one attribute includes luminance and/or color constancy.

12. The apparatus of claim 10, wherein generating depth information determines a kernel weight for each of the plurality of image pixels based on the proximity of the at least one attribute between the plurality of image pixels and the reference image pixel.

13. The apparatus of claim 12, wherein generating depth information updates the kernel weight of the image pixel to zero when upon the corresponding image pixel is determined to be excluded from the object that the reference image pixel belongs to.

14. The apparatus of claim 10, wherein generating depth information processes a plurality of portions of the image with a sliding window arranged to define each of the plurality of portions of the image; wherein the sliding window is arranged to move across the image, and the plurality of objects are substantially separated by the edge between the adjacent objects and/or a plurality of boundaries of the sliding window.

15. The apparatus of claim 14, wherein the reference image pixel is a center pixel in each of the plurality of portions of the image.

16. The apparatus of claim 1, wherein the depth value assigned to each of the plurality of objects is based on source depth information associated with the image.

17. The apparatus of claim 16, wherein the source depth information includes a resolution lower than or equal to that of the depth information being generated.

18. The apparatus of claim 1, wherein the depth information includes a depth map associated with the image.

19. A method for generating depth information associated with an image, comprising the steps of:
   identifying a plurality of objects represented by the image, wherein each object adjacent to another object are identified by an edge arranged to substantially separate the object and the adjacent object, wherein each of the plurality of objects includes a plurality of image pixels arranged to interconnect with each other, and the edge is represented by a plurality of edge pixels the plurality of image pixels in each of the object are disconnected from the plurality of image pixels in the adjacent object by the plurality of edge pixels therebetween; and
   generating the depth information by assigning a depth value for each of the plurality of objects, wherein the depth value is arranged to represent a distance between the object and a reference point in a three-dimensional space.

20. The method of claim 19, wherein the edge between the adjacent objects is continuous, such that the object and the adjacent object are entirely separated by the edge.

21. The method of claim 19, further comprising the step of performing an edge detection process to identify the edge on the image.

22. The method of claim 19, wherein the plurality of objects are further identified based on a proximity of at least one attribute between the plurality of image pixels and a reference image pixel of the image.

23. The method of claim 22, further comprising the step of determining a kernel weight for each of the plurality of image pixels based on the proximity of the at least one attribute between the plurality of image pixels and the reference image pixel.

24. The method of claim 22, further comprising the step of processing a plurality of portions of the image with a sliding window arranged to define each of the plurality of portions of the image; wherein the sliding window is arranged to move across the image, and the plurality of objects are substantially separated by the edge between the adjacent objects and/or a plurality of boundaries of the sliding window.

25. The method of claim 19, wherein the depth value assigned to each of the plurality of objects is based on source depth information associated with the image.

26. The method of claim 19, wherein the depth information includes a depth map associated with the image.

* * * * *